United States Patent [19]

Brady et al.

[11] 4,233,022
[45] Nov. 11, 1980

[54] APPARATUS FOR FORMING HEAT TREATED BLOWN THERMOPLASTIC ARTICLES

[75] Inventors: Thomas E. Brady, Sylvania; Santos W. Go, Toledo, both of Ohio

[73] Assignee: Owens-Illinois, Inc., Toledo, Ohio

[21] Appl. No.: 922,931

[22] Filed: Jul. 10, 1978

Related U.S. Application Data

[62] Division of Ser. No. 824,389, Aug. 15, 1977, abandoned.

[51] Int. Cl.³ .................. B29C 17/07; B29C 25/00
[52] U.S. Cl. ................................ 425/525; 215/1 C; 264/520; 264/521; 425/446; 425/526
[58] Field of Search ............. 425/526, 446, 525; 264/520, 521; 215/1 C

[56] References Cited

U.S. PATENT DOCUMENTS

| | | | |
|---|---|---|---|
| 3,191,225 | 6/1965 | E. F. Polka | 425/526 |
| 3,781,395 | 12/1973 | A. R. Uhlig | 264/521 X |
| 3,970,419 | 7/1976 | E. I. Valyi | 425/526 X |
| 4,039,641 | 8/1977 | T. R. S. Collins | 264/524 X |
| 4,102,626 | 7/1978 | H. Scharrenbroich | 425/526 |

FOREIGN PATENT DOCUMENTS

| | | | |
|---|---|---|---|
| 2339019 | 2/1975 | Fed. Rep. of Germany | 425/526 |
| 2400951 | 7/1975 | Fed. Rep. of Germany | 264/521 |
| 2540930 | 4/1976 | Fed. Rep. of Germany | 264/538 |

*Primary Examiner*—Jan H. Silbaugh
*Attorney, Agent, or Firm*—Charles S. Lynch; M. E. Click; D. H. Wilson

[57] ABSTRACT

A method and apparatus are disclosed for developing a strain crystallized morphology in blowbottles of thermoplastic material by a heat treatment process subsequent to a blow molding operation. In a first embodiment, the blow mold itself includes means for differentially heating the blown article along its length so that only those portions which have been significantly molecularly oriented are heat treated. In a second embodiment, separate mold-shaped members are mounted adjacent the blow mold to receive the blown articles to apply the desired heat treatment process. In the method, an essentially amorphous thermoplastic parison is expanded in a blow molding operation at a temperature conducive to molecular orientation and strain induced crystallization. Then, the highly molecularly oriented bottle portions are heat treated to develop crystalline growth, while other non-molecularly oriented bottle portions may be simultaneously cooled.

1 Claim, 7 Drawing Figures

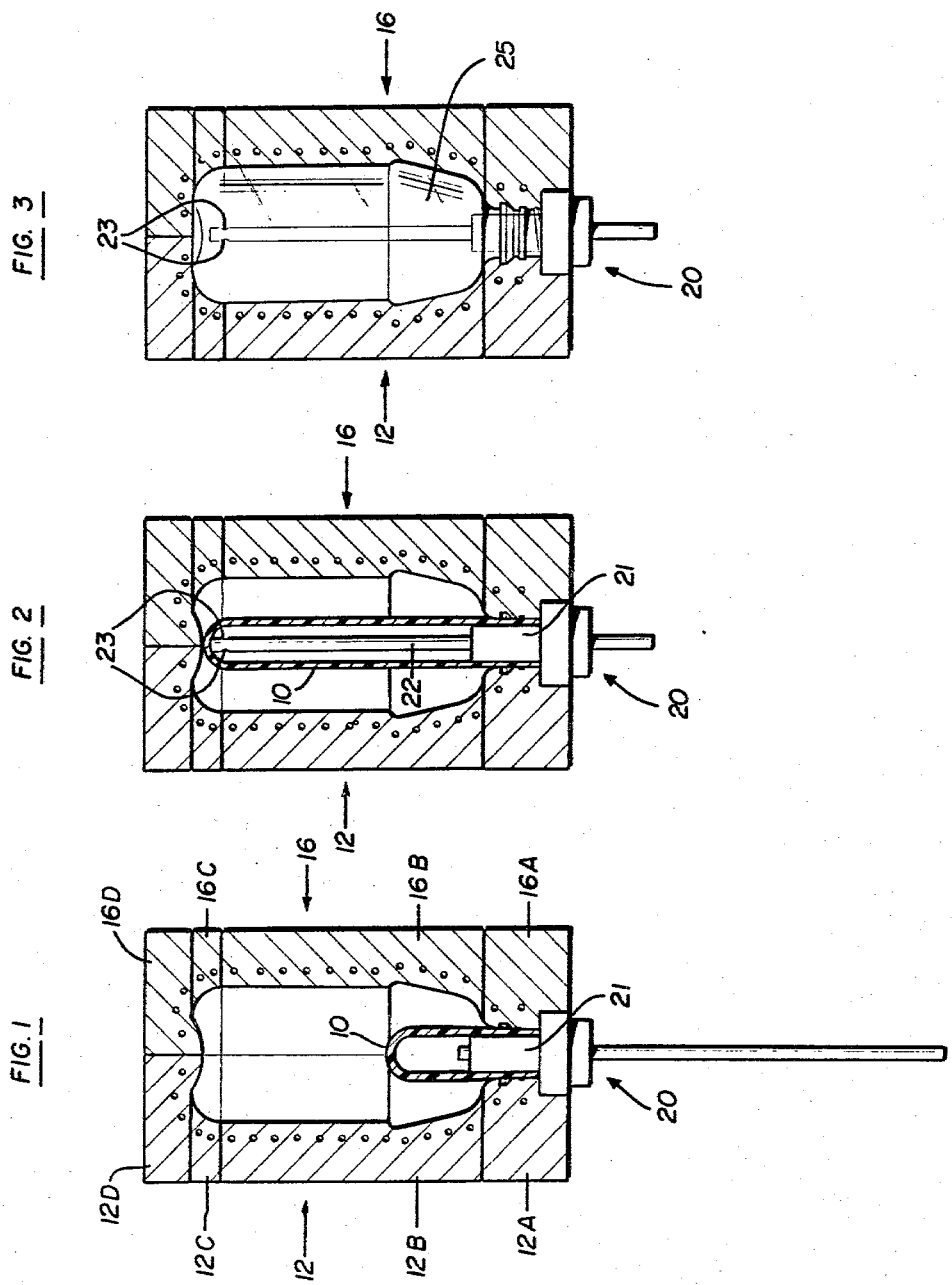

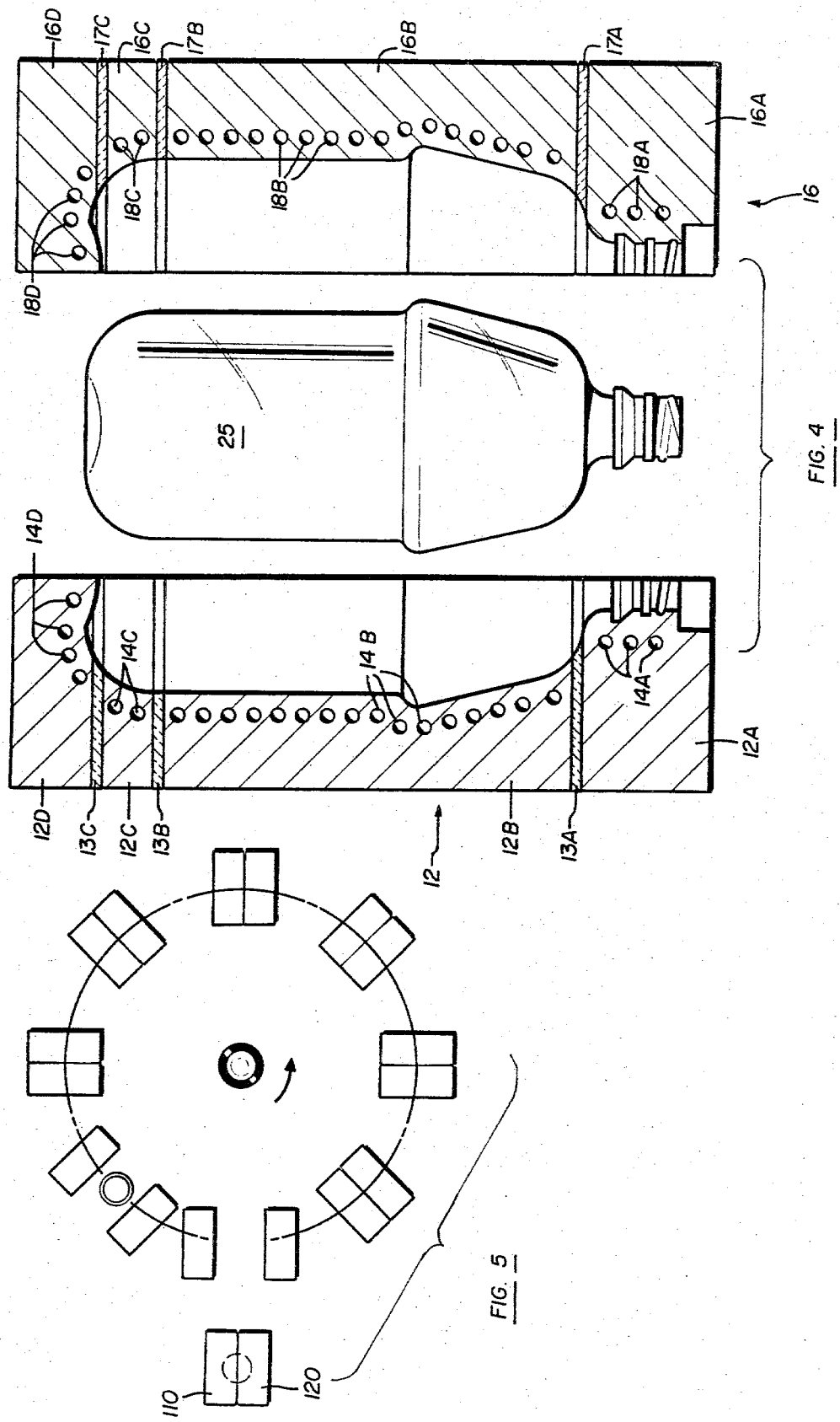

APPARATUS FOR FORMING HEAT TREATED BLOWN THERMOPLASTIC ARTICLES

This is a division of application Ser. No. 824,389, filed Aug. 15, 1977, now abandoned.

BACKGROUND OF THE INVENTION

1. Field of the Invention

This invention relates to a method and apparatus for inducing crystallization in a blown thermoplastic article. More particularly, the invention relates to thermally conditioning a blown article of polyethylene terephthalate so that only those portions of the bottle which have been molecularly oriented will be heated, in order to produce a clear article having enhanced physical properties.

2. The Prior Art

Various prior art patents have disclosed methods of producing biaxially oriented polyethylene terephthalate film which is subjected to a heat setting treatment for crystallization. Examples of such patents are U.S. Pat. Nos. 3,177,277, 2,995,779, 3,107,139, and 2,823,421 and British Pat. Nos. 851,874, 915,805, and 1,803,665, all incorporated by reference. Even more recently, U.S. Pat. No. 3,733,309, which is also incorporated by reference, has disclosed a blown polyethylene terephthalate bottle that may be heat treated.

However, the prior art has not taken into consideration that a blown polyethylene terephthalate bottle will have different degrees of molecular orientation along its axial dimension. Non-discriminate heat treating of the complete bottle would induce spherulitic crystal growth in non-molecularly oriented portions of the bottle. The resulting bottle, having opaque, brittle portions, would be commercially and structurally undesirable. Additionally, the prior art has not suggested how to heat treat a blown bottle while preventing distortion of the bottle due to the shrinkage of the material during heat treatment.

Accordingly, the prior art has not recognized the potential problems and adverse effects in heat treating blown thermoplastic bottles and has not suggested any solutions for those problems.

SUMMARY OF THE INVENTION

The present invention recognizes and solves the problem in the prior art relating to heat treating blown thermoplastic bottles.

The apparatus of this invention may take the form of either one of two or more embodiments. Specifically, either the blow molds themselves or separate mold-shaped members may be provided with heating means to effect the desired heat treatment. In either embodiment, the apparatus includes a pair of sectional members which cooperatively define an interior cavity conforming to the size and shape of the desired blown article. Each sectional member includes thermally segregated portions along the axis of the cavity, with means being provided to heat at least one corresponding portion in each sectional member for heat treating the corresponding portions of the blown articles. Preferably, means are provided for applying a fluid pressure to the interior of the blown article while the article is heat treated, in order to improve heat transfer and to resist shrinkage of the thermoplastic material. Additionally, means may be provided for axially stretching the parison either during or prior to the blowing sequence.

In the method, a parison of an essentially amorphorous material, i.e. having less than about 5% crystallinity, is thermally conditioned to a temperature within a range conducive to molecular orientation. For polyethylene terephthalate, this temperature range is from about 75 to about 110° C. Then, the parison is expanded within a blow mold cavity while the material is within the desired temperature range in order to achieve a blown article having portions which are molecularly oriented to differing extents. For example, the body of a bottle is stretched and oriented during blowing to a greater extent than are the finish and heel portions of the bottle. The expansion rate of the material may be selected within desired ranges, but preferably to achieve strain-induced crystallization. Subsequent to the blowing step, the blown article is subjected to a heat treating process where the highly molecularly oriented portions of the article, e.g. the body of a bottle, are heated to a temperature highly conducive to crystalline growth. Other less oriented article portions, e.g. the finish and heel portions of a bottle, may be either cooled or heat treated at a lower temperature to limit the extent of crystalline growth in those regions.

The blown and heat treated article made by this method and apparatus will include differentially crystallized regions, corresponding to the nature of the orientation and heat treatment to which that region has to be subjected. For example, the region which was most highly molecularly oriented during blowing will also be the most highly crystallized region following the heat treatment process. The crystalline structure achieved in that particular region by this process will have a strain-crystallized morphology as opposed to a spherulitic thermally crystallized morphology by virtue of that region having been molecularly oriented prior to being heat treated. Other less oriented portions of the article will be less crystallized or even essentially amorphous even after the blow molding operation and the thermal conditioning step. For example, the thermoplastic material of a bottle neck would not be substantially expanded during the blow molding operation and would therefore not be molecularly oriented. It is preferable to cool this portion of the article during the heat treatment process to prevent the development or generation of spherulitic crystals which would result in an opaque, brittle structure. Other portions of the article, e.g. the bottle heel or bottom, might include moderately developed molecular orientation which is only slightly heat treated in order to limit the generation of undesired spherulitic crystals. Of course, the heat treatment temperatures and the heat treatment time periods will depend upon the particular thermoplastic material, the extent of molecular orientation, and the desired levels of crystallinity to be achieved by heat treatment.

Accordingly, the present invention enables the following advantages not found in the prior art.

First, this invention enables the achievement in thermoplastic materials of various improved property characteristics, such as yield stress, density, improved impermeability, and greater barrier resistance, greater creep resistance, greater dimensional stability, and greater thermal resistance. While achieving these improved property characteristics, the invention does not sacrifice clarity in the thermoplastic material to any great extent.

These property level improvements provide numerous advantages. For example, a bottle made according to the present invention, and having the same thickness as a bottle made from a similar parison by the techniques of the prior art, will have a greater strength and crystallinity. The crystallinity appears to be quite important in reducing carbon dioxide permeation for containers used to bottle carbonated beverages.

Additionally, for a given set of bottle or container requirements, the present invention permits the use of a thinner bottle, which is more desirable because it (a) requires less material, (b) simplifies parison forming, and (c) reduces the extent of parison reheating prior to blowing.

These and other advantages and meritorious features of the present invention will be more fully appreciated from the following detailed description of the invention and the appended claims.

BRIEF DESCRIPTION OF THE DRAWINGS

FIGS. 1-3 illustrate a parison within a blow mold cavity during the stretching and blowing operations.

FIG. 4 illustrates a blown bottle between the opened sections of the blow mold, which is enlarged in order to illustrate the various thermally segregated regions for appropriately thermally conditioning the blown article.

FIGS. 5 and 6 schematically illustrate an embodiment where a blown article is formed in a first blow mold and then transferred to one of a plurality of sectional members for the thermal conditioning step.

DETAILED DESCRIPTION OF THE PREFERRED EMBODIMENTS

Figure 7:
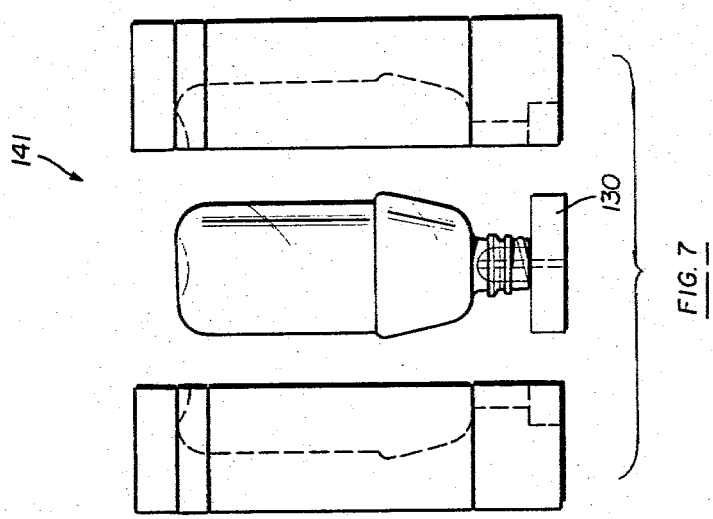
FIG. 7 is a sectional view taken along plane 7—7 of FIG. 6, depicting the blown article between the opened sections prior to the heat treating step.
Figure 6:
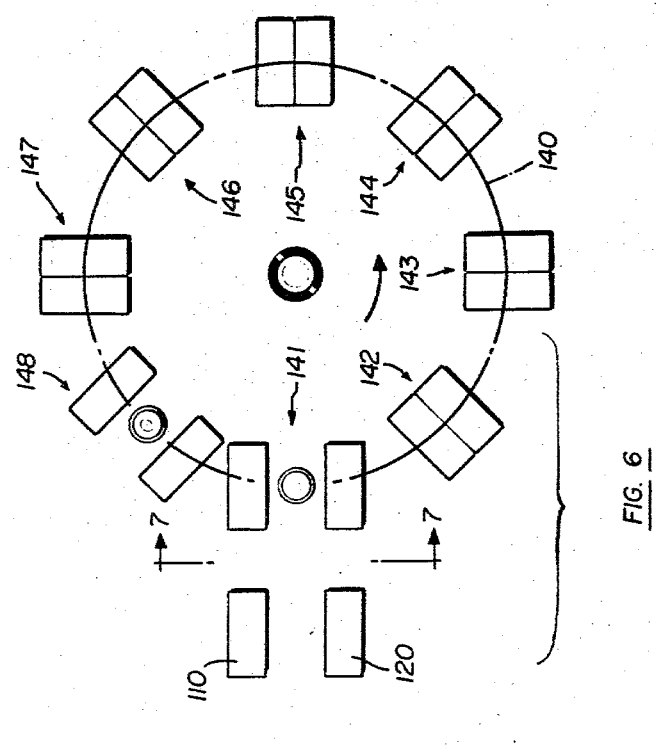

The present invention relates to a method and apparatus for heat treating a blown thermoplastic article subsequent to a blow molding operation. The heat treating step may be performed either in the blow mold itself, as shown in the embodiment of FIGS. 1-4, or in a separate mold shaped member, as shown in the embodiment of FIGS. 5-7.

The Embodiment of FIGS. 1-4

In this embodiment, the blown article is heat treated within the mold sections, which are shown best in FIG. 4. These sections are designated by reference numerals 12 and 16, and respectively include four thermally segregated sections 12A-12D and 16A-16D. The mold sections are separated by appropriate insulation material shown be reference numerals 13A, 13B, 13C, 17A, 17B, and 17C. A suitable material is a glass ceramic sold by Corning Glass Works under the trademark Macor. Alternatively, the mold could be mounted to mold blocks with an air gap where the insulation is shown. Of course, the mold sections 12 and 16 will be made of a suitable metallic material, as is conventional, and may be mounted to mold blocks and presses (not shown).

Each portion of the mold sections may include suitable means for thermally conditioning the blown article subsequent to the blow molding operation. As shown, these thermal conditioning means may comprise internal fluid ducts 14A-D and 18A-D. Suitable means (not shown) may supply the thermal conditioning fluid to these ducts by appropriate supply ports in a conventional manner.

In accordance with the present disclosure, mold sections 12A and 16A define a neck defining region which will grip the opened portion of a parison. Mold sections 12B and 16B cooperatively define the main body portion of the cavity which forms the tubular body portion of the blown article. Sections 12C and 16C cooperatively define an annular heel portion of the article, which integrally interconnects the blown body portion to a bottom formed by mold sections 12D and 16D. As will become more apparent from the following portions of the disclosure, fluid ducts 14A and 18A will preferably receive coolant fluid in order to reduce the temperature of the plastic material in the neck of the bottle. Fluid ducts 14B, 14C, 18B, and 18C will preferably receive heated fluid, such as a high temperature silicone oil, in order to heat treat the corresponding bottle portions. Ducts 14D and 18D may either receive heated or cooled fluid, depending upon the morphology of the plastic material in this region of the article subsequent to the blow molding operation.

Referring to FIGS. 1-3, a blowable parison 10 is shown in FIG. 1 as mounted on a core 21 of a blow pin mechanism 20 within the mold cavity defined by mold sections 12 and 16. Prior to placement within the mold, the parison is thermally conditioned to a temperature within the range for molecular orientation. For polyethylene terephthalate, the parison is preferably heated to a temperature within the range of from about 75 to about 110 degrees C., The precise temperature being dependent upon the inherent viscosity of the material. Prior to the initial heat treatment, the thermoplastic material is essentially amorphous, i.e., having less than about 5% crystallinity. Of course, thermoplastic materials other than polyethylene terephthalate may be treated in accordance with the present invention.

In accordance with this particular embodiment, the parison 10 is initially stretched by an axially movable blow pin 22, as shown in FIG. 2. The stretch rate may be selected as desired to establish a molecular orientation and to preferably initiate strain-induced crystallization, the rate being dependent upon the particular thermoplastic material, the temperature of the material, the desired crystallization and the extent of molecular orientation. For example, polyethylene terephthalate may be stretched within the range of from about 10% per second to about 500% per second, and most preferably at a rate of about 100% per second. That is, a parison having an initial length of two inches will have an axial length of four inches after one second when stretched at a rate of 100% per second. Other thermoplastic materials may have different stretch rates, such as on the order of 1000% per second polyethylene.

As will be appreciated by those in the art, the initial axial stretching of the material establishes axial molecular alignment and initiates strain-induced crystallization in those materials that are susceptible to the generation of such a morphology. Axially stretching may be performed either prior to or concurrently with the introduction of blow fluid into the interior of the parison.

To complete the blow molding operation, blow fluid under pressure is introduced into the interior of parison by way of radial ports 23 in the stretch and blow pin 22. This pressure may be selected as desired for various thermoplastic materials. For polyethylene terephthalate, the blow fluid is at a pressure of preferably between about 300 and about 600 psi when introduced into the parison prior to any adiabatic expansion, and more preferably, between about 300 and 500 psi. Alternatively, the blow fluid could be supplied at a pressure of about 100 to 200 psi during initial expansion and then be increased to about 300 to 500 psi just before the material strikes the mold wall surfaces. The blowing operation achieves molecular orientation and further develops strain-induced crystallization.

In accordance with the present embodiment, the blown article 25 is retained within the blow mold cavity for the heat treating operation. Because of the configuration of the bottle and because of the differential expansion of the material during the stretch and blow steps, the material in the various portions of the bottle will have different morphologies. More particularly, the material in the neck of the bottle will remain essentially amorphous, having been crystallized and molecularly oriented very little, if any, during the initial thermal conditioning and the blow molding operation. The body portion of the article will have the greatest degree of molecular orientation by virtue of that portion of the parison having been stretched more than any other parison portions. The annular heel or rounded portion of the bottle will have some molecular orientation, but probably less than that in the body portion of the bottle. The bottom of the bottle may have very little molecular orientation or may be molecularly oriented to at least some degree. Thus, the present invention proposes that the blown article be differentially thermally conditioned in order to further enhance the strain crystallized morphology in the body of the bottle while cooling other bottle portions so that a spherulitic morphology is avoided in those bottle portions.

For example, for a bottle formed of polyethylene terephthalate, the neck portion of the bottle is cooled by circulating coolant fluid through internal ducts 14A and 18A to maintain the material in the essentially amorphous condition. The body portion of the bottle is heated to a temperature within the range of from about 150 to about 220 degrees C. for the heat treating process. Most preferably, this bottle section is heated to a temperature of about 180 degrees C., where maximum crystallization rates occur. The annular heel portion of the bottle may be heated to a temperature within the range from about 100 to about 200 degrees C., depending upon the extent of molecular orientation developed in that bottle portion during the stretch and blow molding operation, with lower temperatures being desirable for those situations where that portion of the bottle is not significantly oriented. The bottom of the bottle may be cooled in the event that very little molecular orientation is developed or alternatively may be heated to a temperature within the range of from 100 to 200 degrees C. if heat treating is appropriate.

The time period for heat treating may be selected to correspond with certain variables, including the inherent viscosity of the material, the material thickness, and the desired extent of crystallinity. For polyethylene terephthalate, the heat treating cycle may be selected to fall within the range from about 10 seconds to about 10 minutes, depending primarily upon the extent of crystallinity, and the penetration of crystallization across the wall thickness. For example, the surface of the blown article could be rapidly heated to induce crystallization only near the surface, resulting in enhanced property characteristics. Preferably the body portion of the bottle will have a crystallinity of between about 10% and 50% after the heat treating process. U.S. Pat. No. 2,823,421, incorporated by reference, may be consulted to determine the desired heat treating times for desired extents of crystallinity. Of course, the embodiment shown in FIGS. 1-4 is preferable for relatively short heat treating time periods from a cycle time standpoint. For greater heat treating time periods, it may become desirable to cool the blown bottle within the blow mold and then transfer the blown bottle to a separate cavity formed by section members conforming with those shown in FIG. 4 to perform the heat treating process.

In the embodiment of FIGS. 1-4, the blow pressure should preferably be maintained in the interior of the blown article in order to resist shrinkage of the material during the heat treating process and to maintain the material against the cavity wall to achieve definition and heat transfer. Once the material has been appropriately heat set, the mold sections may be opened to eject the bottle. The material in the different portions of the bottle should be in an essentially self-sustaining condition as a result of the heat treating and cooling. Of course, coolant fluid could be circulated through ducts 14B, 14C, 18B and 18C after the heat treating process to cool the bottle, if desired, to assure that the material is in the self-sustaining condition.

The article formed by this process will be essentially free of spherulitic crystals, but will be crystallized in those regions where significant molecular orientation has been developed in order to achieve a strain crystallized morphology.

The Embodiment of FIGS. 5-7

In this embodiment, the article is initially blown in a cavity defined by a pair of blow mold sections 110 and 120. These sections will be essentially like those shown in FIG. 4, without the thermally segregated regions, and will include internal ducts to receive coolant fluid. In the method of this embodiment, an essentially amorphous thermoplastic parison is first thermally conditioned to a temperature within a range conducive to molecular orientation. Then, the parison is placed within the mold cavity formed by sections 110 and 120, whereupon blow fluid under pressure is introduced into the interior of the parison to form the blown container. Next, the material of the parison is cooled within the blow mold sections to a self-sustaining condition.

Once the blown article is cooled sufficiently, it is transferred on a blow pin 130 from the initial blow molding station to a position between one of several pairs of mold-shaped cavity forming members which are mounted around the periphery of a rotatable turret member 140. These pairs of mold cavity members are designated by reference numerals 141-148 (See FIG. 6) and should preferably be formed in accordance with the cavity members shown in FIG. 4. Appropriate displacement structure (not shown) may be utilized to sequentially transfer a plurality of blow pins 130 between the blow molding station and the rotatable turret, a suitable displacement structure being shown in Pat. No. 3,599,280, which is incorporated by reference.

After the blown article and blow pin 130 are displaced to the position shown in FIG. 7, the sections of cavity forming member 141 are closed on the article to initiate the heat treating process. Essentially simultaneously, the sections of cavity forming members 148 are opened to accommodate the ejection of an article that has already been heat treated. Then, the blow pin associated with members 148 may be displaced back to the blow mold to receive a subsequent parison for blow molding. Then, turret 140 is indexed in a counterclockwise direction so that mold section 141 assumes the position previously held by member 142. As a result, the sections of member 148 are aligned with blow mold sections 110 and 120 to receive a subsequently blown article. The article within cavity-forming member 141 is then heat treated as the turret is sequentially indexed. Most preferably, blow fluid under pressure is supplied to the interior of the blown article by way of blow pin 130 and a source (not shown) during the heat treating process in order to resist material shrinkage. As will be appreciated, the embodiment of FIGS. 5-7 accommodates the heat treating of a blown article when greater crystallinity is desired, thereby requiring greater heat treating time periods. The overall blow molding cycle time is not increased by this embodiment since the blow molding operation is not dependent upon the heat treating cycle.

The resultant bottle may be formed so that the body portion is of a thickness that would otherwise permit $CO_2$ permeation, such as when holding carbonated beverages, but for the strain crystallized morphology of the material in that region. In other words, the bottle may be formed thinner, with the morphology resisting $CO_2$ permeation.

It will be understood that the foregoing embodiments are exemplary in nature rather than limiting since various modifications may be made to the disclosure without departing from the overall inventive concept. For example, thermoplastic materials other than polyethylene terephthalate may be treated in accordance with this invention and therefore require different cycle times from those disclosed herein; it is not necessary to stretch the material prior to the blowing step, as shown in the embodiment of FIGS. 5-7; and the parison may be thermally condition to the proper blowing temperature by cooling the parison after an injection molding process.

Having therefore completely and sufficiently disclosed our invention, we now claim:

1. An apparatus for heat treating a blown oriented thermoplastic article in a final blow mold, comprising:
   a final blow mold comprising sectional members which cooperatively define an interior cavity having a longitudinal axis and essentially conforming to the size and shape of a final blown thermoplastic article that is a hollow container having a neck, a blown body portion, a bottom, and an annular heel integrally interconnecting the bottom and the body;
   means to provide the thermoplastic material between the blow mold for blowing at its orientation temperature;
   each sectional member including at least four thermally segregated portions corresponding to said bottle portions along a longitudinal axis of the cavity, thermal insulation layers separating each sectional member portion from the adjacent sectional member portion;
   means to blow the material to the final container shape and means for applying a fluid pressure to the interior of the article while the article is heat treated;
   heating means to heat treat parts of the final article in thhe sectional member by heating the annular oriented body and heel bottle portions, said heating means including internal fluid ducts within those sectional member portions corresponding to the body and heel bottle portions and means for supplying heated fluid to said internal ducts,
   wherein the neck and bottom portions of said sectional members include internal fluid ducts, and means for supplying coolant fluid to the internal ducts of the neck portion.

* * * * *